US011980983B2

(12) United States Patent
Chera (10) Patent No.: US 11,980,983 B2
(45) Date of Patent: May 14, 2024

(54) CYLINDER BLOCK FIXTURE

(71) Applicant: VAN NORMAN MACHINE (INDIA) PVT LTD, Chandigarh (IN)

(72) Inventor: Ranjit (Robin) Chera, Chandigarh (IN)

(73) Assignee: VAN NORMAN MACHINE (INDIA) PVT LTD, Chandigarh (IN)

( * ) Notice: Subject to any disclaimer, the term of this patent is extended or adjusted under 35 U.S.C. 154(b) by 169 days.

(21) Appl. No.: 17/879,818

(22) Filed: Aug. 3, 2022

(65) Prior Publication Data

US 2024/0042561 A1 Feb. 8, 2024

(51) Int. Cl.
*B23Q 1/26* (2006.01)
*B25B 11/02* (2006.01)
*B25H 1/00* (2006.01)

(52) U.S. Cl.
CPC ............ *B23Q 1/26* (2013.01); *B25H 1/0007* (2013.01); *B25B 11/02* (2013.01)

(58) Field of Classification Search
CPC . Y10T 29/53983; B25H 1/0007; B25B 11/02; B23Q 3/062; B23Q 2703/105; B23Q 2703/10; B23Q 1/522; B23Q 1/525
See application file for complete search history.

(56) References Cited

U.S. PATENT DOCUMENTS

| | | | | |
|---|---|---|---|---|
| 1,812,585 A | * | 6/1931 | Collins | B25H 1/0007 248/172 |
| 6,619,645 B1 | * | 9/2003 | Rottler | B23Q 1/52 269/296 |
| 9,327,374 B1 | | 5/2016 | McCulloch | |

* cited by examiner

*Primary Examiner* — Tyrone V Hall, Jr.
(74) *Attorney, Agent, or Firm* — LexAnalytico Consulting; Riyon Rae Harding (57) ABSTRACT

A cylinder block fixture for securing a workpiece is disclosed. The cylinder block fixture includes a base and clamping members. The clamping members are positioned apart at a distance facing each other on the base. Each of the clamping members includes a support plate at one end and a hand wheel at another end. Each of the support plates comprises a shaft, support bars, and support rods facing the opposite clamping member. The support rods extend from the support bars. The shafts at the support plates receive a camshaft housing of a workpiece. The workpiece includes a cylinder block. The support rods secure the workpiece. The hand wheel rotates and causes the workpiece to rotate. The workpiece rotates to align and take reference from a main bore or a pan rail surface of the workpiece to perform machining operations on the workpiece.

19 Claims, 8 Drawing Sheets

FIG. 11

CYLINDER BLOCK FIXTURE

FIELD OF THE INVENTION

The present invention relates to a fixture. More particularly, the present invention relates to a cylinder block fixture for holding and aligning a cylinder block such as an engine block to perform machining and aligning operations.

BACKGROUND OF THE INVENTION

It is known that cylinder block fixtures or automatic block fixtures help to locate and/or hold a cylinder block during either a machining operation or some other industrial process. The cylinder block fixtures use a plurality of posts. The plurality of posts helps to position the cylinder block to perform various machining and aligning operations. Alternatively, a mounting frame is used to hold the cylinder block in order to perform various machining and aligning operations.

Several cylinder block fixtures have been disclosed in the past to secure or hold the cylinder block. One such example is disclosed in a United States granted U.S. Pat. No. 6,619,645, entitled, "Fixturing system for holding and aligning engine blocks during rebuilding" ("the '645 Patent"). The '645 Patent discloses a fixturing system for rigidly clamping an engine block while precisely orienting the engine block for accurate machining of selected engine surfaces during a rebuilding process. The fixturing system is designed to be mounted on a working table to machine and/or inspect a variety of block surfaces. The fixturing system comprises a headstock assembly, tail stock assembly, a support member, and an indexing member. The engine block is placed between the headstock assembly and the tail stock assembly. The support member is inserted through the main bearing crankshaft bore and connects with the headstock assembly and the tail stock assembly to align and rigidly clamp the engine block to the tool table. The engine block may then be rotated to an indexed position by inserting the indexing cam bar through the cam bore and into locating slots in the headstock assembly.

Another example is disclosed in United States granted U.S. Pat. No. 9,327,374 entitled, "CNC fixture" ("the '374 Patent"). The '374 Patent discloses a fixture for a milling machine to position and manipulate related work pieces. The fixture has a first sub fixture powered to rotate a rotary plate and a second sub fixture. The fixture includes one of a first plate fixture and a second plate fixture for the mounting of workpieces. The rotary plate is mounted to the first sub-fixture such that the rotary plate can be rotated by the first sub-fixture. The rotary plate attaches to one of the first plate fixture and the second plate fixture. The rotary plate includes a first precision surface adapted for mounting of the first plate fixture and a second precision surface adapted for mounting of the second plate fixture. The fixture includes a tailstock plate mounted to the second sub-fixture. The tailstock plate attaches to one of the first plate fixture and the second plate fixture.

Yet another example is disclosed in Chinese Publication No. 103753271, entitled, "Air cylinder clamp" ("the '271 Publication"). The '271 Publication discloses an air cylinder clamp. The air cylinder clamp comprises a base, spindle hole semi-circular location blocks, clamping units, and a cylinder hole slider linkage opening unit. Location end surface matched with to-be-located air cylinder front and rear stop spindle semi-circular holes are arranged on the spindle hole semi-circular location blocks. The clamping units are arranged on base location bosses on the inner sides of the spindle hole semi-circular location blocks and comprise clamping supports, T-shaped screw pairs, and clamping pressing blocks. A middle block bearing stop location block is provided with air cylinder bearing block location sides. The cylinder hole slider linkage opening unit comprises a base column and a cylinder hole slider component arranged at the top end of the base column. The air cylinder clamps clamp the air cylinder from the end and the sides, the measurement probe spot measurement function of a machining center spindle is used for finding reference coordinate values of machining of air cylinder process location pin holes, and accordingly, accurate machining of air cylinder process location pin holes is achieved, and the air cylinder hole wall thickness uniformity is guaranteed finally.

Although the above-discussed cylinder block fixtures are useful to secure the cylinder block, they have a few problems. For instance, the above-discussed cylinder block fixtures are limited in their functionality in that they can be secured for a particular configuration of the cylinder block. For example, a single cylinder block fixture is used for one type of cylinder block configuration such as a V4 cylinder block, a V6 cylinder block, or a V8 cylinder block. As a result, the existing cylinder block fixtures can only be used for one type of cylinder block. Further, the existing cylinder block fixtures require precision locators to check alignment, check the precision fit to mating parts, and perform various operations on the cylinder block.

Therefore, there is a need for an improved cylinder block fixture that can hold and align a cylinder block to perform machining and aligning operations without requiring precision locators.

SUMMARY

It is an object of the present invention to provide a cylinder block fixture that avoids the drawbacks of known cylinder block fixtures.

It is another object of the present invention to provide a cylinder block fixture that helps to hold and adjust the position and rotation of a workpiece easily.

It is another object of the present invention to provide a cylinder block fixture that allows for quick and precise installation and removal of the workpiece.

It is yet another object of the present invention to provide a cylinder block fixture that avoids the use of precision locators.

It is yet another object of the present invention to provide a single cylinder block fixture that holds the workpiece of various types.

In order to achieve one or more objects, the present invention discloses a cylinder block fixture. The cylinder block fixture includes a base and clamping members. The clamping members are positioned apart at a distance facing each other on the base. Each of the clamping members includes a support plate at one end and a hand wheel at another end. Each of the support plates includes a shaft, support bars, and support rods facing the opposite clamping member. The support rods extend from the support bars. The support bars are positioned at one end of the support plate. The support rods are positioned perpendicularly from the support bars. The shafts at the support plates receive a camshaft housing of a workpiece. The workpiece includes a cylinder block. The support rods secure the workpiece. The hand wheel rotates and causes the workpiece to rotate. The workpiece rotates to align and take reference from a main bore or a pan rail surface of the workpiece to perform machining operations on the workpiece.

One of the clamping members includes a first sleeve housing. The first sleeve housing connects to the hand wheel at one end. The first sleeve housing includes an extendable sleeve arm at another end. The extendable sleeve arm connects to the shaft. The extendable sleeve arm extends and retracts into the first sleeve housing and adjusts the distance between the clamping members for securing the workpiece.

One of the clamping members includes a second sleeve housing. The second sleeve housing includes a gear transmission unit. The gear transmission unit includes a propeller shaft. The second sleeve housing connects the hand wheel to the shaft. The hand wheel rotates and causes the workpiece to rotate. The workpiece rotates to align and take reference from the main bore or the pan rail surface of the workpiece to perform machining operations on the workpiece. The machining operations include one of a deck surfacing operation, a cylinder block boring operation, and a cylinder honing operation.

In one advantageous feature of the present invention, the cylinder block fixture allows quick positioning of parallel and non-parallel side heads. Further, the cylinder block fixture provides sturdy clamping with strong clamping devices. The cylinder block fixture allows the workpiece to rotate 360° to provide easy access to the whole sides of the cylinder block for various jobs.

In another advantageous feature of the present invention, the cylinder block fixture helps to take reference from a main bore or a pan rail surface of the workpiece to perform machining operations on the workpiece.

In another advantageous feature of the present invention, the cylinder block fixture helps to inspect the workpiece as per the specification in blue-printing designs.

In yet another advantageous feature of the present invention, the cylinder block fixture helps to hold a workpiece such as a V6 cylinder block, or a V8 cylinder block easily.

In yet another advantageous feature of the present invention, the cylinder block fixture helps to perform deck surfacing, cylinder block boring, and cylinder honing operations with high accuracy.

In yet another advantageous feature of the present invention, the cylinder block fixture allows the operator to use any size of bushing or collects corresponding to the main bearing bore sizes.

In yet another advantageous feature of the present invention, the cylinder block fixture helps to take reference from any dowel pins or holes of the workpiece.

Features and advantages of the invention hereof will become more apparent in light of the following detailed description of selected embodiments, as illustrated in the accompanying FIGUREs. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention so as to enable those skilled in the art to practice the invention. It will be noted that throughout the appended drawings, like features are identified by like reference numerals. Notably, the FIGUREs and examples are not meant to limit the scope of the present invention to a single embodiment, but other embodiments are possible by way of interchange of some or all of the described or illustrated elements and, further, wherein.

DETAILED DESCRIPTION OF THE EMBODIMENTS

Before the present features and working principle of a cylinder block fixture are described, it is to be understood that this invention is not limited to the particular device as described, since it may vary within the specification indicated. Various features of a cylinder block fixture might be provided by introducing variations within the components/subcomponents disclosed herein. It is also to be understood that the terminology used in the description is for the purpose of describing the particular versions or embodiments only, and is not intended to limit the scope of the present invention. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

In the present invention, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a cylinder block fixture, it is to be further understood that numerous changes may arise in the details of the embodiments of the cylinder block fixture. It is contemplated that all such changes and additional embodiments are within the spirit and true scope of this disclosure.

Various features and embodiments of a cylinder block fixture are explained in conjunction with the description of FIGS. 1-11.

Figure 1:
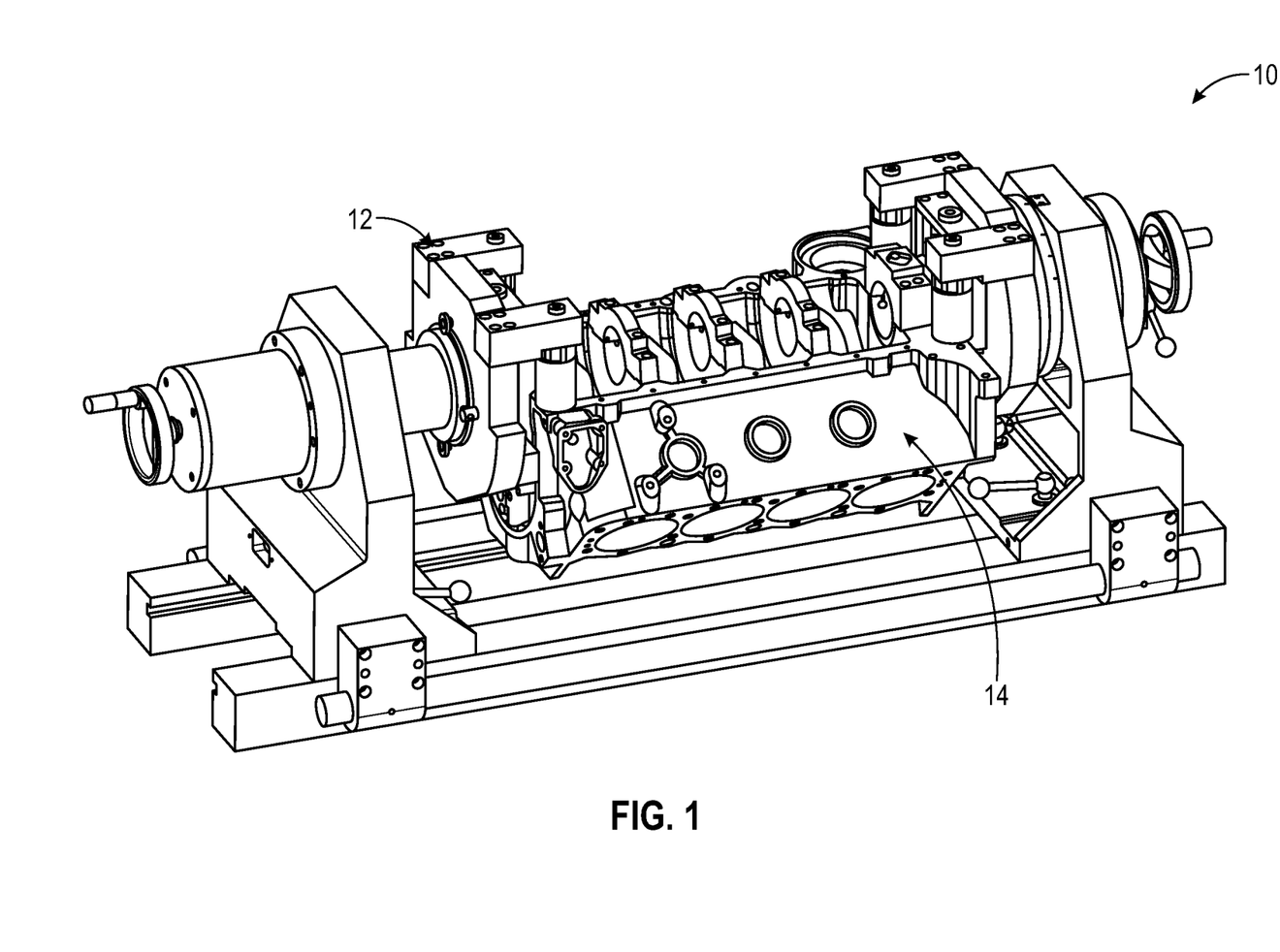
FIG. 1 shows an environment in which a cylinder block fixture is implemented, in accordance with one embodiment of the present invention.

FIG. 1 shows an environment 10 in which a cylinder block fixture 12 implements, in accordance with one embodiment of the present invention. Cylinder block fixture 12 is also referred to as a "fixturing system", a "workpiece clamping device", a "workpiece holding device", a "clamping device", etc. Cylinder block fixture 12 secures a workpiece 14 for performing a variety of machining operations. For example, workpiece 14 includes an engine block or a cylinder block. The cylinder block includes a V-block, a V6 cylinder block, or a V8 cylinder block. The presently disclosed cylinder block fixture 12 is used to secure workpiece 11 to perform various operations. For example, the operations include, but are not limited to, deck surfacing, cylinder block boring, cylinder honing, etc.

Figure 2:
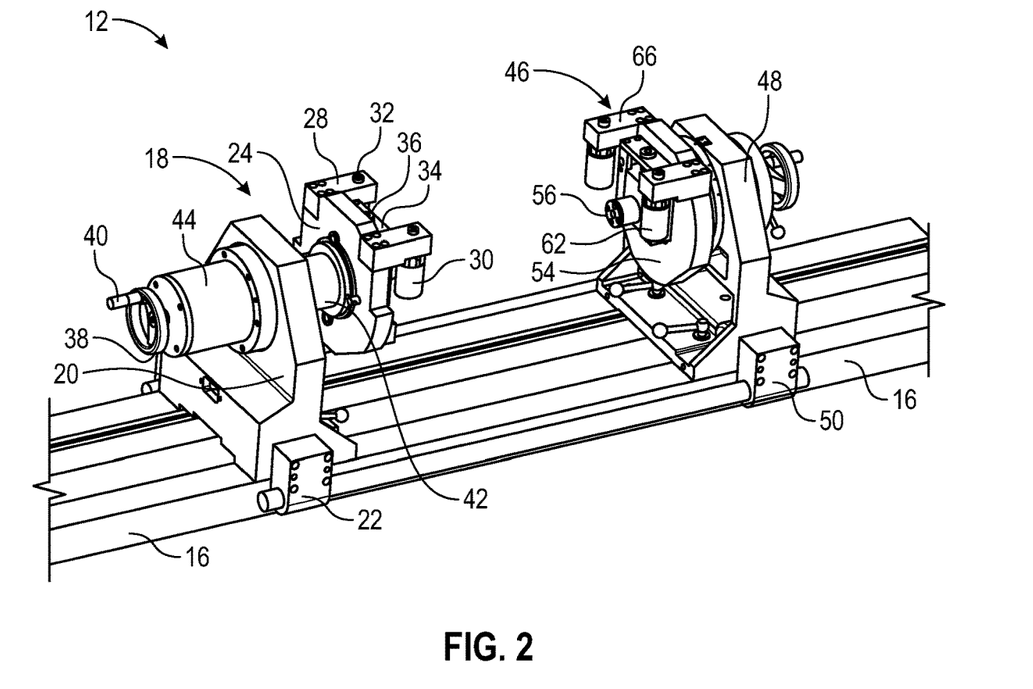
FIGS. 2 and 3 show a perspective view and a side view, respectively, of the cylinder block fixture, in accordance with one embodiment of the present invention.

Now referring to FIG. 2, a perspective view of cylinder block fixture 12 is shown, in accordance with one embodiment of the present invention. Cylinder block fixture 12 includes a base or base bars 16. Base 16 is made up of cast iron, mild steel, or any other suitable material. Base 16 acts as a rigid support for placing all other components of cylinder block fixture 12. Base 16 is capable of resisting compressive loads and vibrations caused during the operation of cylinder block fixture 12. Cylinder block fixture 12 includes a first positioning support system 18. First positioning support system 18 is also referred to as a tailstock or tailstock assembly. First positioning support system 18 includes a first clamping member or first column 20. First clamping member 20 is fixedly mounted on base 16 using a first locking member 22.

In one implementation, first positioning support system 18 includes a first support plate 24 at one end of first clamping member or first column 20. First support plate 24 is made up of cast iron, mild steel, or any other suitable material. First support plate 24 includes a first shaft 26. First Shaft 26 extends from and positions perpendicularly to first support plate 24. First Shaft 26 positions at the substantially center of first support plate 24. First support plate 24 includes a plurality of first support bars 28. Plurality of first support bars 28 extend from and are positioned at the top or at one end of first support plate 24. As can be seen from FIG. 2, plurality of first support bars 28 are positioned perpendicularly to first support plate 24. First support plate 24 includes a plurality of first support rods 30. In one example, each first support rod 30 connects and extends perpendicularly from first support bar 28. In one example, first support rod 30 connects to first support rod 30 using connecting member 32 such as a fastener. Further, first support plate 24 includes first support block 34. First support block 34 couples to first support plate 24 using attaching means 36 such as a fastener.

First positioning support system 18 includes a first sleeve housing 44. First sleeve housing 44 extends from first clamping member 20 at opposite side of first support plate 24. First sleeve housing 44 includes a first hand wheel 38. First hand wheel 38 includes a first lever 40. First lever 40 helps to rotate first hand wheel 38 either in a clockwise direction or an anti-clockwise direction. Further, first sleeve housing 44 includes an extendable sleeve arm 42. Extendable sleeve arm 42 extends from first sleeve housing 44 drawing through first clamping member 20 and connects first shaft 26.

In operation, an operator actuates first lever 40 by rotating first lever 40 in a clockwise or an anticlockwise direction. Rotating first lever 40 causes extendable sleeve arm 42 to extend or retract into first sleeve housing 44. Extending extendable sleeve arm 42 causes first support plate 24 to move away from first clamping member 20. In one example, first lever 40 is actuated either manually or automatically. Alternatively, first lever 40 is actuated by electric or hydraulic, or pneumatic actuators. It should be understood that any type of actuator can be used depending on the need.

Cylinder block fixture 12 includes a second positioning support system 46. Second positioning support system 46 is also referred to as a headstock or headstock assembly. Second positioning support system 46 includes a second clamping member or second column 48. Second clamping member 48 is fixedly mounted on base 16 using second locking member 50. As can be seen from FIGS. 1 and 2, first clamping member 20 and second clamping member 48 are positioned apart at a distance from one another and facing each other. First locking member 22 and second locking member 50 present a rod 52. First clamping member 20 and second clamping member 48 are brought closer and separated apart via rod 52.

Second positioning support system 46 includes a second support plate 54. Second support plate 54 is made up of cast iron, mild steel, or any other suitable material. Second support plate 54 positions adjacent to second clamping member 48 facing first clamping member 20. Second support plate 54 includes a second shaft 56. Second Shaft 56 extends from and positions perpendicularly to second support plate 54. Second shaft 56 includes holes 58 at one end. Holes 58 helps to connect a camshaft (not shown) between first support plate 24 and second support plate 54 for supporting workpiece 14. Second support plate 54 includes a plurality of second support bars 60. Plurality of second support bars 60 extend from and positioned at the top or one end of second support plate 54. Second support plate 54 includes a plurality of second support rods 62. Each of plurality of second support rods 62 connects and extends perpendicularly from second support bar 60. In one example, second support rod 62 connects to second support bar 60 using connecting member 32. Second support plate 54 further includes second support block 66. Second support block 66 couples to second support plate 54 using connecting means 68 such as a fastener, as shown in FIG. 4.

Figure 3:
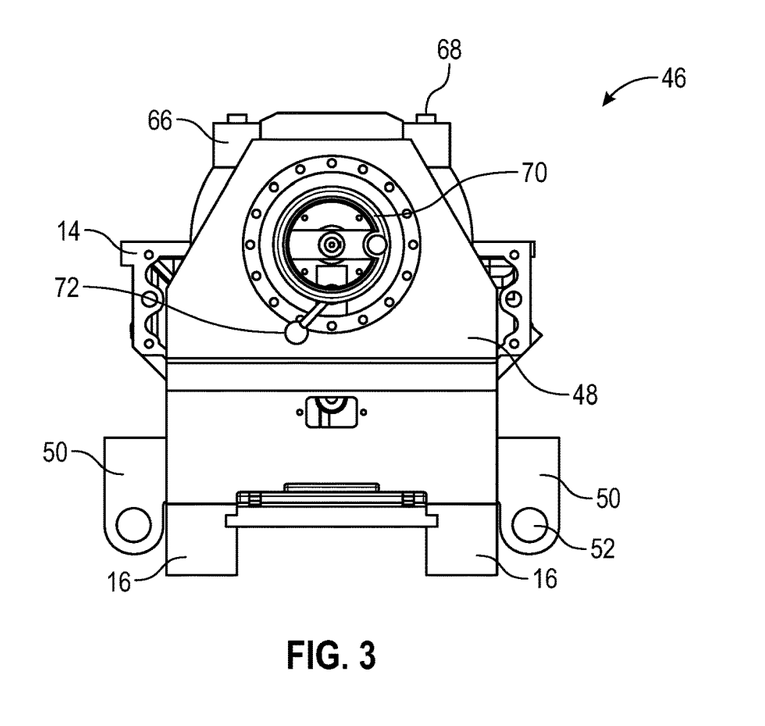

Now referring to FIG. 3, a side view of second positioning support system 46 is shown. As can be seen, second positioning support system 46 includes a second hand wheel 70 connected via a second sleeve housing 76. Second sleeve housing 76 positions at opposite side of second support plate 54. Second sleeve housing 76 is explained with the help FIG. 5. Second hand wheel 70 includes a second lever 72. Second lever 72 helps to rotate second hand wheel 70 either in a clockwise direction or an anti-clockwise direction.

Figure 4:
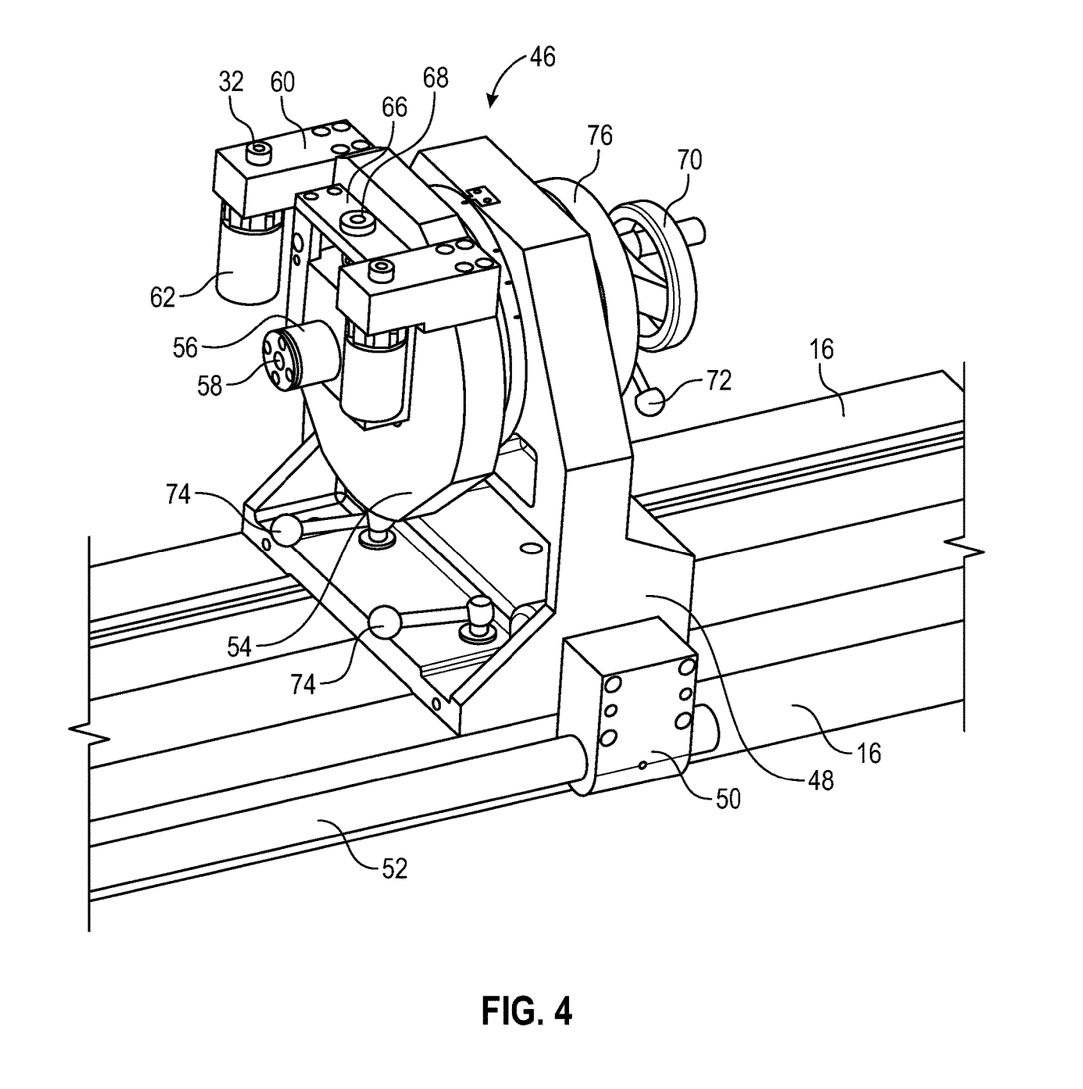
FIG. 4 shows a perspective view of a second positioning support system, in accordance with one embodiment of the present invention.

FIG. 4 shows a perspective view of second positioning support system 46, in accordance with one embodiment of the present invention. Each of first clamping member 20 and second clamping member 48 includes a handle lever 74. Handle lever 74 helps to secure or tighten first clamping member 20 and second clamping member 48 to base 16.

Figure 5:
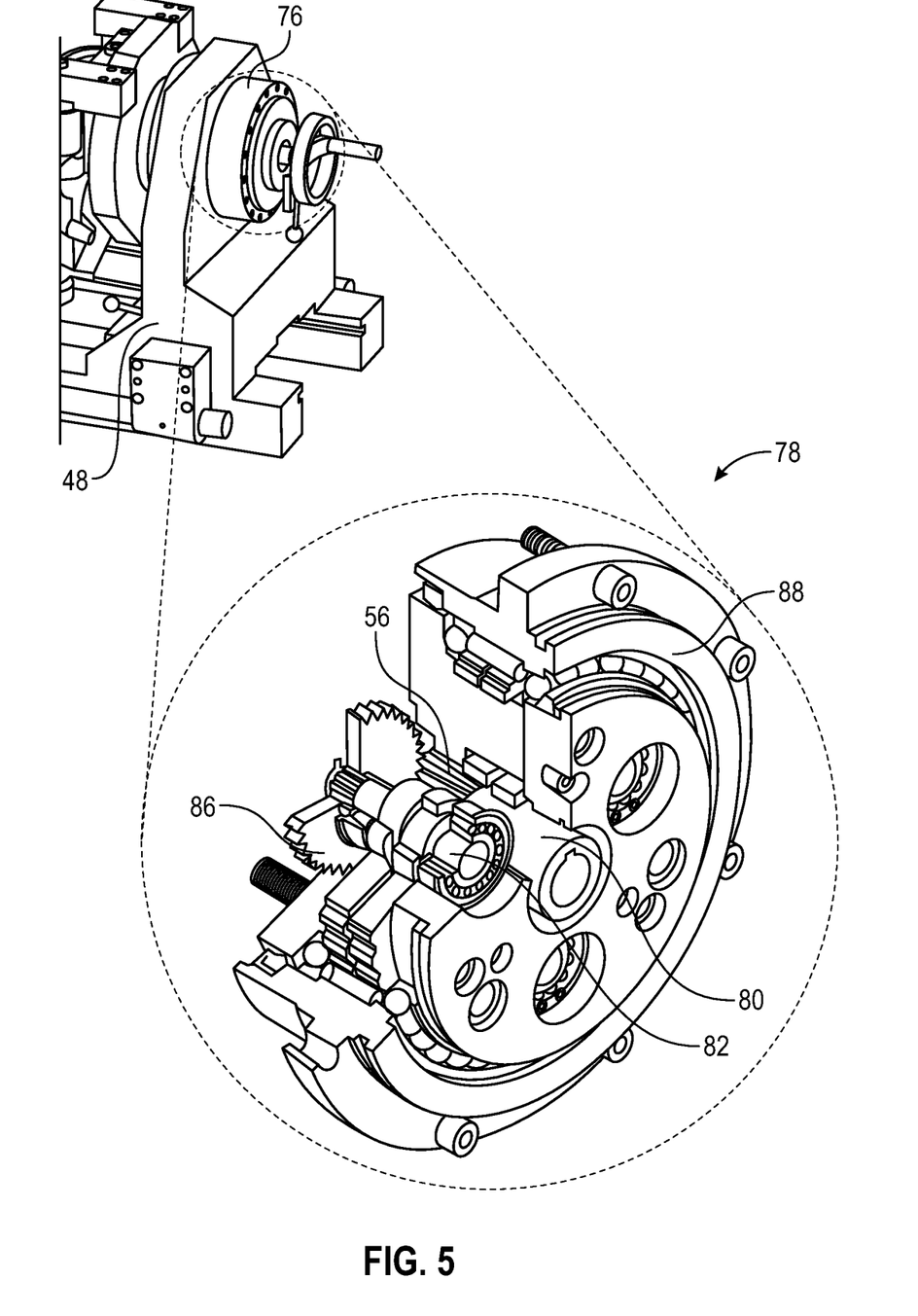
FIG. 5 shows a perspective view of the second positioning support system having a gear transmission unit, in accordance with one embodiment of the present invention.

FIG. 5 shows internal components of second sleeve housing 76, in accordance with one embodiment of the present invention. Second sleeve housing 76 includes a gear transmission unit or reduction gearbox 78. Gear transmission unit 78 can include any type of reduction gearbox such as a single reduction gearbox, a double reduction gear box, a magnetic speed reducer, a parallel shaft reduction gearbox, a planetary gearbox, or a right-angle worm reduction gearbox, or a helical gearbox. Gear transmission unit 78 includes a propeller shaft 80. Propeller shaft 80 connects second shaft 56. Gear transmission unit 78 includes a motor shaft 82, a first gear 84, a second gear (not shown). First gear 86 indicates a pinion gear. First gear 86 connects to motor shaft 82. Second gear indicates a larger gear. The second gear connects to propeller shaft 80. Further, gear transmission unit 78 includes bearings 88 for reducing friction.

In operation, the operator rotates second hand wheel 70 which causes first gear 86 to rotate. The rotation of first gear 86 causes the rotation of the second gear. As specified above, the second gear directly couples to propeller shaft 80. As such, the rotation of second hand wheel 70 is directly translated to rotate propeller shaft 80. Propeller shaft 80 shaft rotates second shaft 56.

Figure 6:
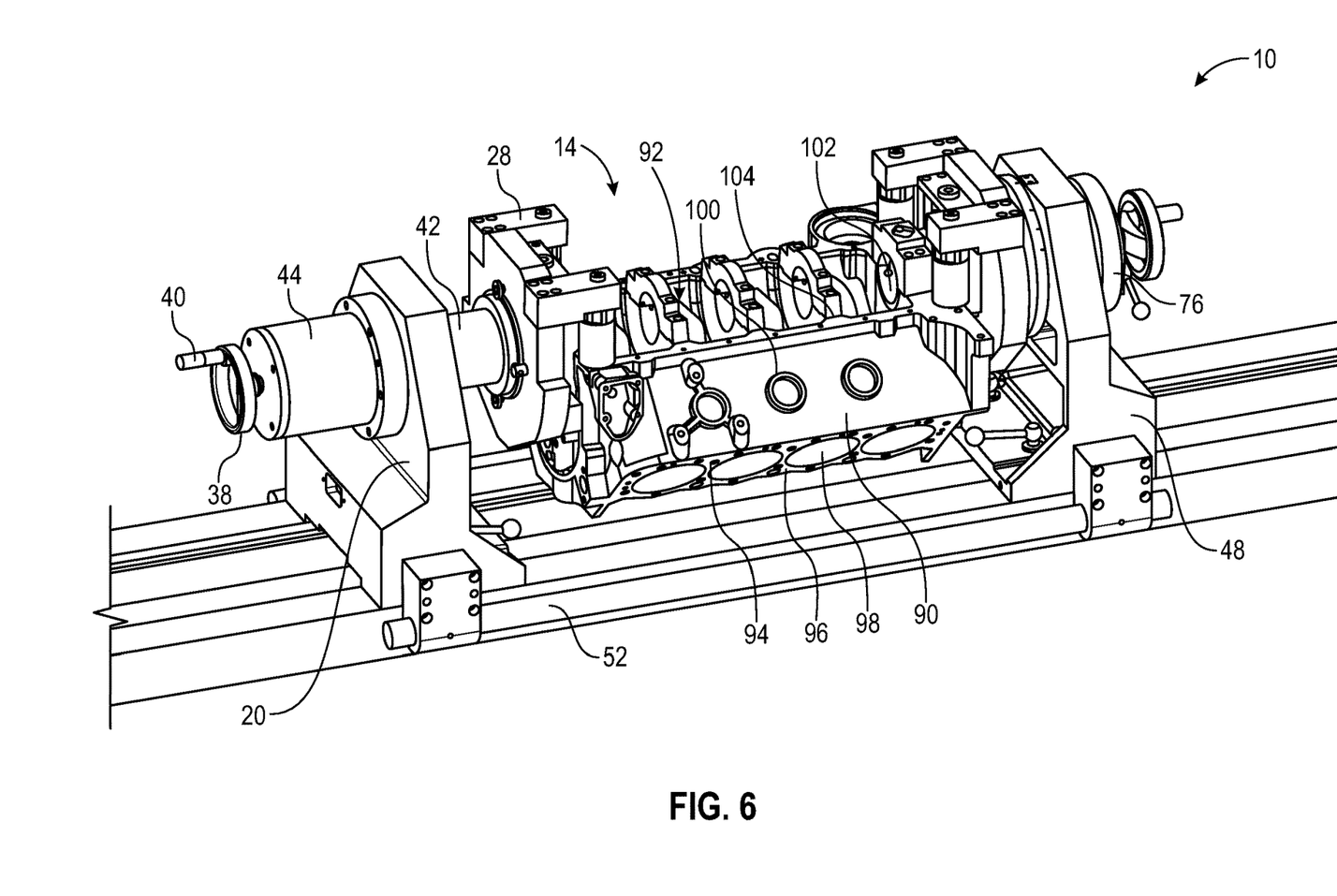
FIGS. 6 and 7 show perspective views of the cylinder block fixture holding a workpiece, in accordance with one embodiment of the present invention.
Figure 7:
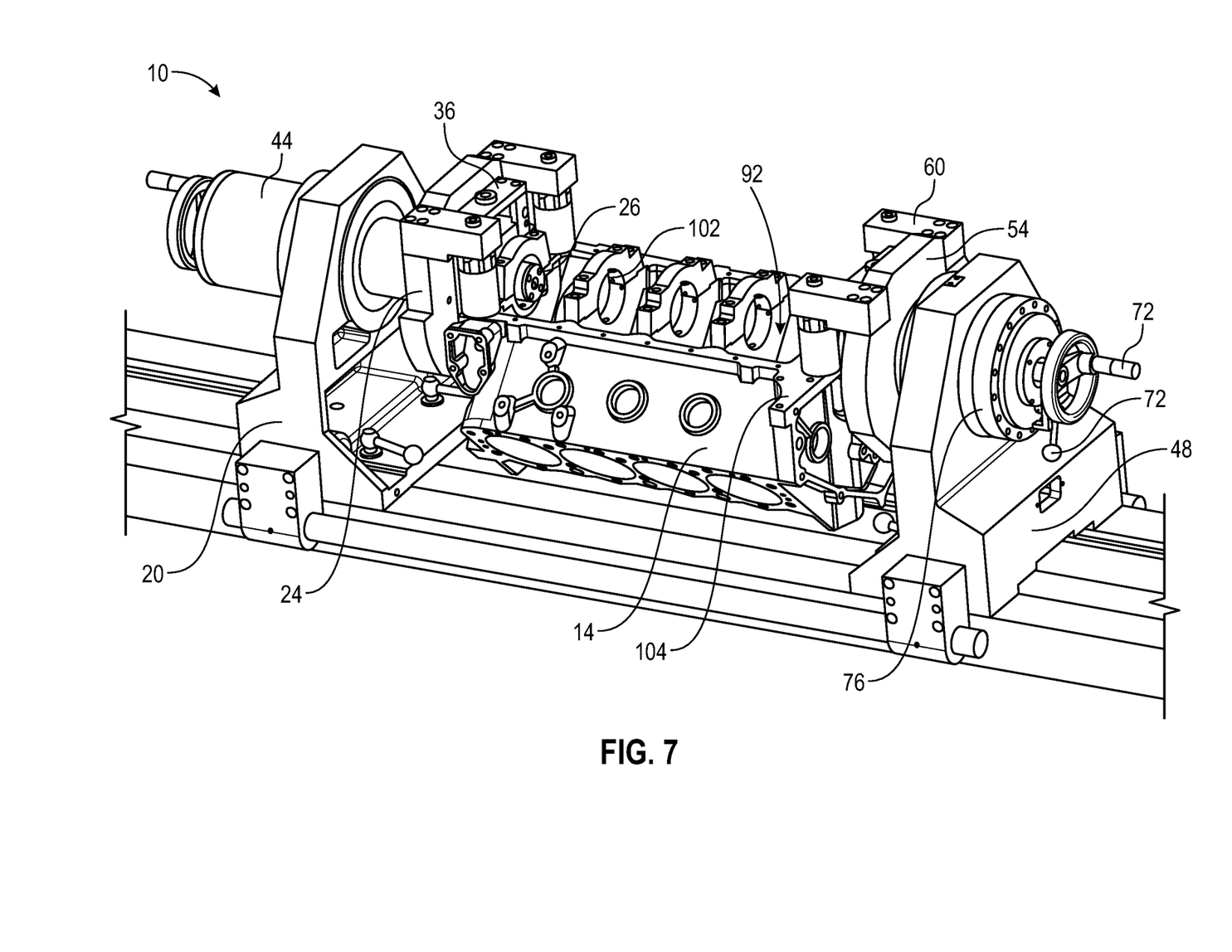

In accordance with the present invention, the presently disclosed cylinder block fixture 12 secures different types of workpieces 14 for performing various operations. FIGS. 6 and 7 show perspective views of cylinder block fixture 12 holding workpiece 14, in accordance with one exemplary embodiment of the present invention. In the present example, a V8 cylinder block is shown. A person skilled in the art understands that the V8 cylinder block is shown for illustrative purpose only and that the presently disclosed cylinder block fixture 12 can be used to align or perform machining operations on any other type of workpiece 14 without departing from the scope of the present invention.

Workpiece 14 includes a housing 90. Housing includes a bearing bore 92, a deck surface 94, a cylindrical wall 96, cylindrical bores 98, core plugs 100, a camshaft housing 102, a gasket surface 104, pan rails 106, and a coolant passage 108. In the present embodiment, workpiece 14 is positioned between first support plate 24 and second support plate 54 such that camshaft housing 102 aligns with first shaft 26 and second shaft 56. Subsequently, first hand wheel 38 or second hand wheel 70 rotates causing extendable sleeve arm 42 to extend and secure workpiece 14 to lock at first shaft 26 and second shaft 56. Once workpiece 14 is secured between first shaft 26 and second shaft 56, the operator tightens fasteners 32 to tighten plurality first support rods 30 and plurality of second support rods 62 to lock the position of workpiece 14 with proper alignment.

Figure 8:
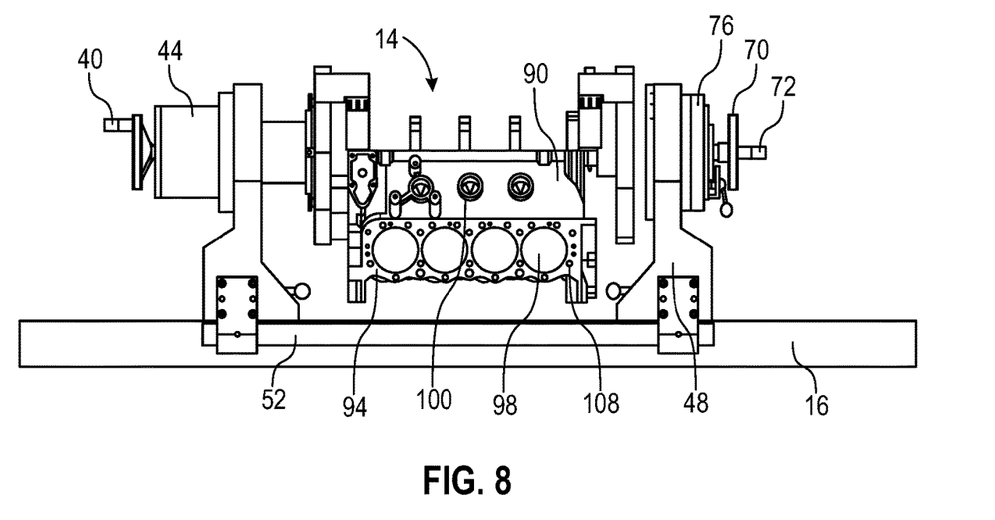
FIGS. 8 and 9 show a front view and a top view, respectively, of the cylinder block fixture holding the workpiece, in accordance with one embodiment of the present invention.
Figure 9:
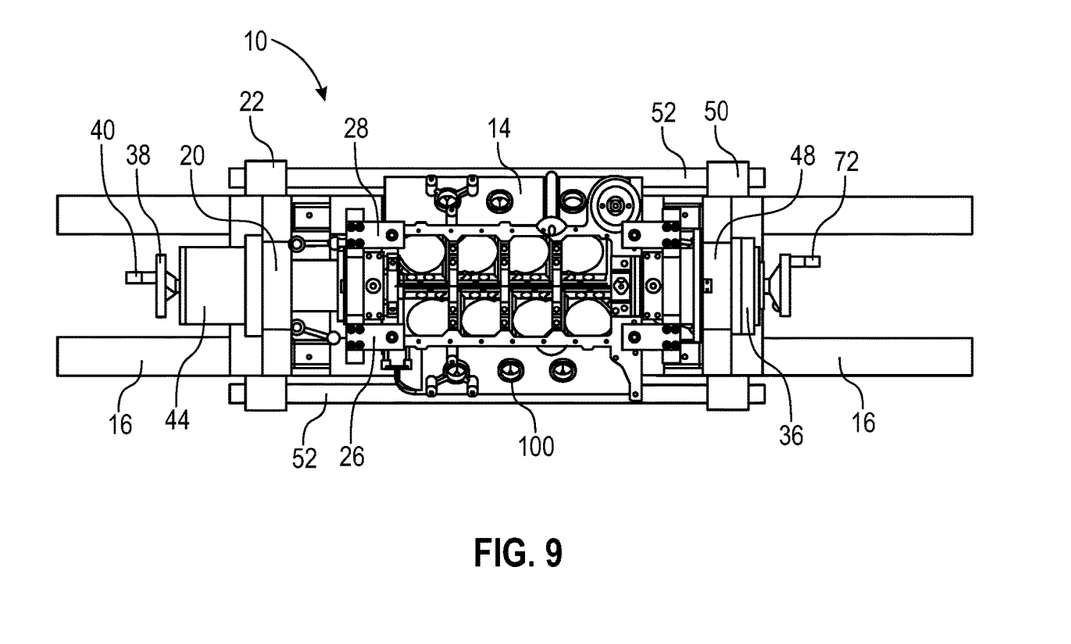

The operator rotates second hand wheel 70 to rotate workpiece 14 depending on the operation that needs to be performed on workpiece 14. FIGS. 8 and 9 show workpiece 14 rotated or turned at various positions depending on the need. In other words, workpiece 14 is rotated at different angles (around the axis) depending on the operation to be performed. The operation includes, but is not limited to deck surfacing, cylinder block boring, and cylinder honing.

Figure 10:
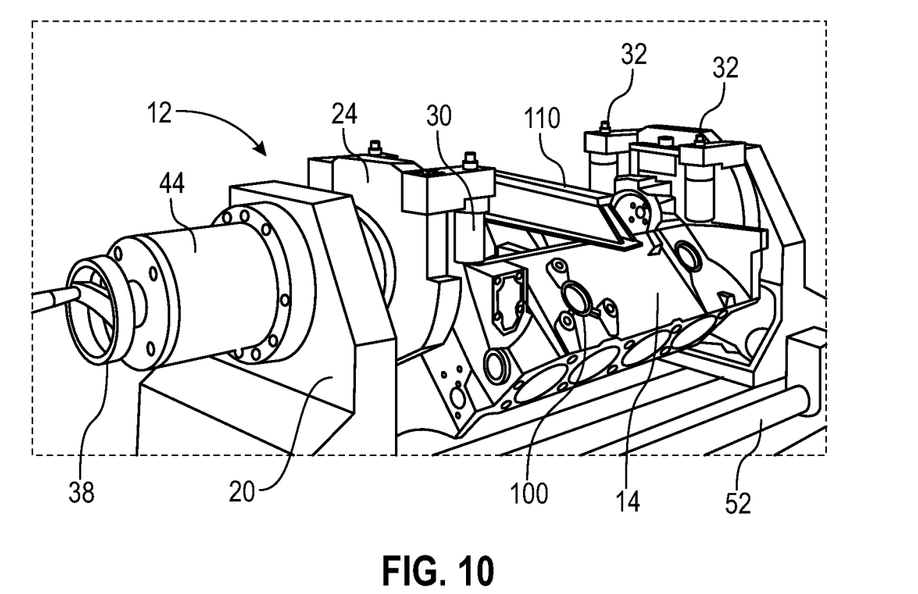
FIGS. 10 and 11 show operational views of the cylinder block fixture holding the cylinder block in different positions and use of a leveling instrument to check the alignment of the cylinder block.
Figure 11:
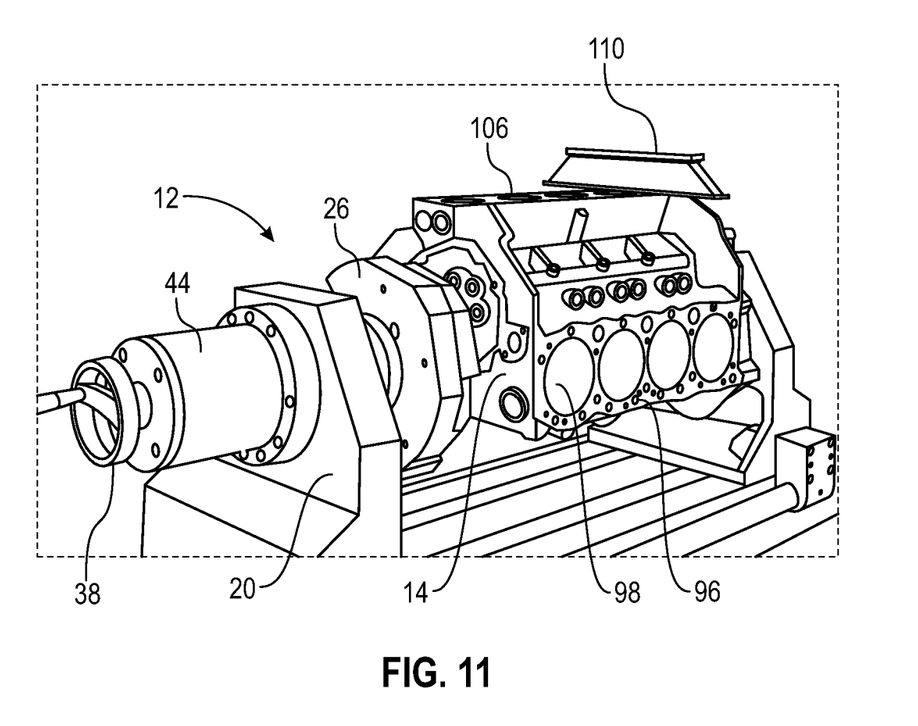

FIGS. 10 and 11 show operational views of cylinder block fixture 12 holding the workpiece 14 in different positions and using a precision locator or leveling instrument 110 to check the alignment of workpiece 14, in accordance with one embodiment of the present invention. For example, FIG. 11 shows workpiece 14 rotated using second hand wheel 70 for facing pan rails 49 upwardly from the base 16. Subsequently, the operator places leveling instrument 110 over pan rails 106 to check the alignment of workpiece 14.

Based on the above, it is evident that the presently disclosed cylinder block fixture allows the workpiece to align at the beginning and rotate for performing a variety of operations. The subsequent operations require no aligning thereby avoiding the need for precision locators. A workpiece of any size can be fitted in the cylinder block fixture and a variety of operations can be performed on the workpiece. The support plates having shafts, support bars and support rods ensure the workpiece gets secured in proper alignment. Once the workpiece is secured, a variety of operations can be performed on the workpiece without the need for a precision locator. The cylinder block fixture allows for taking reference from pan rail surfaces or main bearing bore. Optionally, the cylinder block fixture allows for taking reference from dowel pins/holes, correction of heights from main or camshaft bores to deck surfaces. As such, the cylinder block fixture allows to bore both banks, hone or surface as per the specifications defined.

A person skilled in the art appreciates that the cylinder block fixture may come in a variety of sizes depending on the need and comfort of the user. Further, different materials in addition to or instead of materials described herein may also be used and such implementations may be construed to be within the scope of the present invention. Further, many changes in the design and placement of components may take place without deviating from the scope of the presently disclosed cylinder block fixture.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A cylinder block fixture, comprising:
   a base; and
   clamping members positioned apart at a distance facing each other on said base, wherein each of said clamping members comprises a support plate at one end and a hand wheel at another end,
   wherein each of said support plate comprises a shaft, support bars, and support rods facing opposite said clamping member, wherein said support rods extend from said support bars,
   wherein said shafts at said support plates receive a camshaft housing of a workpiece, wherein said support rods secure said workpiece, and wherein said hand wheel rotates and helps to rotate said workpiece to align and take reference from a main bore or a pan rail surface of said workpiece to perform machining operations on said workpiece.

2. The cylinder block fixture of claim 1, wherein a clamping member of said clamping members comprises a first sleeve housing, wherein said first sleeve housing connects to said hand wheel at one end, wherein said first sleeve housing comprises an extendable sleeve arm at another end, and wherein said extendable sleeve arm connects to said shaft.

3. The cylinder block fixture of claim 2, wherein said extendable sleeve arm extends and retracts into said first sleeve housing and adjusts the distance between said clamping members for securing said workpiece.

4. The cylinder block fixture of claim 1, wherein said support bars position at one end of said support plate.

5. The cylinder block fixture of claim 1, wherein said support rods position perpendicularly from said support bars.

6. The cylinder block fixture of claim 1, wherein a clamping member of said clamping members comprises a second sleeve housing, wherein said second sleeve housing comprises a gear transmission unit, and wherein said gear transmission unit comprises a propeller shaft.

7. The cylinder block fixture of claim 6, wherein said second sleeve housing connects said hand wheel, wherein said hand wheel rotates causing said propeller shaft to rotate, wherein said propeller shaft receives said shaft and causes said workpiece to rotate to align and take reference from said main bore or said pan rail surface of said workpiece.

8. The cylinder block fixture of claim 1, wherein said machining operations comprises one of a deck surfacing operation, a cylinder block boring operation and a cylinder honing operation.

9. A cylinder block fixture, comprising:
a base; and
clamping members positioned apart at a distance facing each other on said base, wherein each of said clamping members comprises a support plate at one end and a hand wheel at another end, wherein a clamping member of said clamping members comprises a second sleeve housing, wherein said second sleeve housing comprises a gear transmission unit, wherein said gear transmission unit comprises a propeller shaft,
wherein each of said support plate comprises a shaft, support bars, and support rods, wherein said shaft, said support bars, and said support rods face opposite said clamping member,
wherein said support rods extend from said support bars, wherein said shafts at said support plates receive a camshaft housing of a workpiece, wherein said support rods secure said workpiece,
wherein said second sleeve housing connects said hand wheel, wherein said hand wheel rotates causing said propeller shaft to rotate, and
wherein said propeller shaft receives said shaft and causes said workpiece to rotate, align and take reference from a main bore or a pan rail surface of said workpiece to perform machining operations on said workpiece.

10. The cylinder block fixture of claim 9, wherein a clamping member of said clamping members comprises a first sleeve housing, wherein said first sleeve housing connects to said hand wheel at one end, wherein said first sleeve housing comprises an extendable sleeve arm at another end, and wherein said extendable sleeve arm connects to said shaft.

11. The cylinder block fixture of claim 10, wherein said extendable sleeve arm extends and retracts into said first sleeve housing and adjusts the distance between said clamping members for securing said workpiece.

12. The cylinder block fixture of claim 9, wherein said support bars position at one end of said support plate, and wherein said support rods position perpendicularly from said support bars.

13. The cylinder block fixture of claim 9, wherein said machining operations comprises one of a deck surfacing operation, a cylinder block boring operation and a cylinder honing operation.

14. A method of providing a cylinder block fixture, said method comprising the steps of:
providing a base;
providing clamping members spaced apart at a distance facing each other on said base, each of said clamping member comprising a support plate at one end and a hand wheel at another end;
providing a shaft, support bars, and support rods at each said support plate, each of said shaft, said support bars, and said support rods facing opposite said clamping member, said support rods extending from said support bars;
receiving a camshaft housing of a workpiece on said shafts of said support plates;
securing said workpiece within said clamping members by said support rods; and
rotating said hand wheel for rotating said workpiece to align and take reference from a main bore or a pan rail surface of said workpiece for performing machining operations on said workpiece.

15. The method of claim 14, further comprising providing a first sleeve housing at a clamping member of said clamping members, said first sleeve housing having said hand wheel at one end and an extendable sleeve arm at another end, said extendable sleeve arm connecting to said shaft.

16. The method of claim 15, further comprising extending and retracting said extendable sleeve arm into said first sleeve housing and adjusting the distance between said clamping members for securing said workpiece.

17. The method of claim 14, further comprising:
positioning said support bars at one end of said support plate; and
positioning said support rods perpendicularly to said support bars.

18. The method of claim 14, further comprising providing a second sleeve housing at a clamping member of said clamping members, said second sleeve housing comprising a gear transmission unit, said gear transmission unit comprising a propeller shaft.

19. The method of claim 18, further comprising connecting said second sleeve housing to said hand wheel, said hand wheel rotating and causing said propeller shaft to rotate, said propeller shaft receiving said shaft and causing said workpiece to rotate.

* * * * *